March 20, 1956  M. LONG  2,738,649
ROTARY PUMP AND MOTOR HYDRAULIC TRANSMISSION
Filed Dec. 1, 1952  4 Sheets-Sheet 1
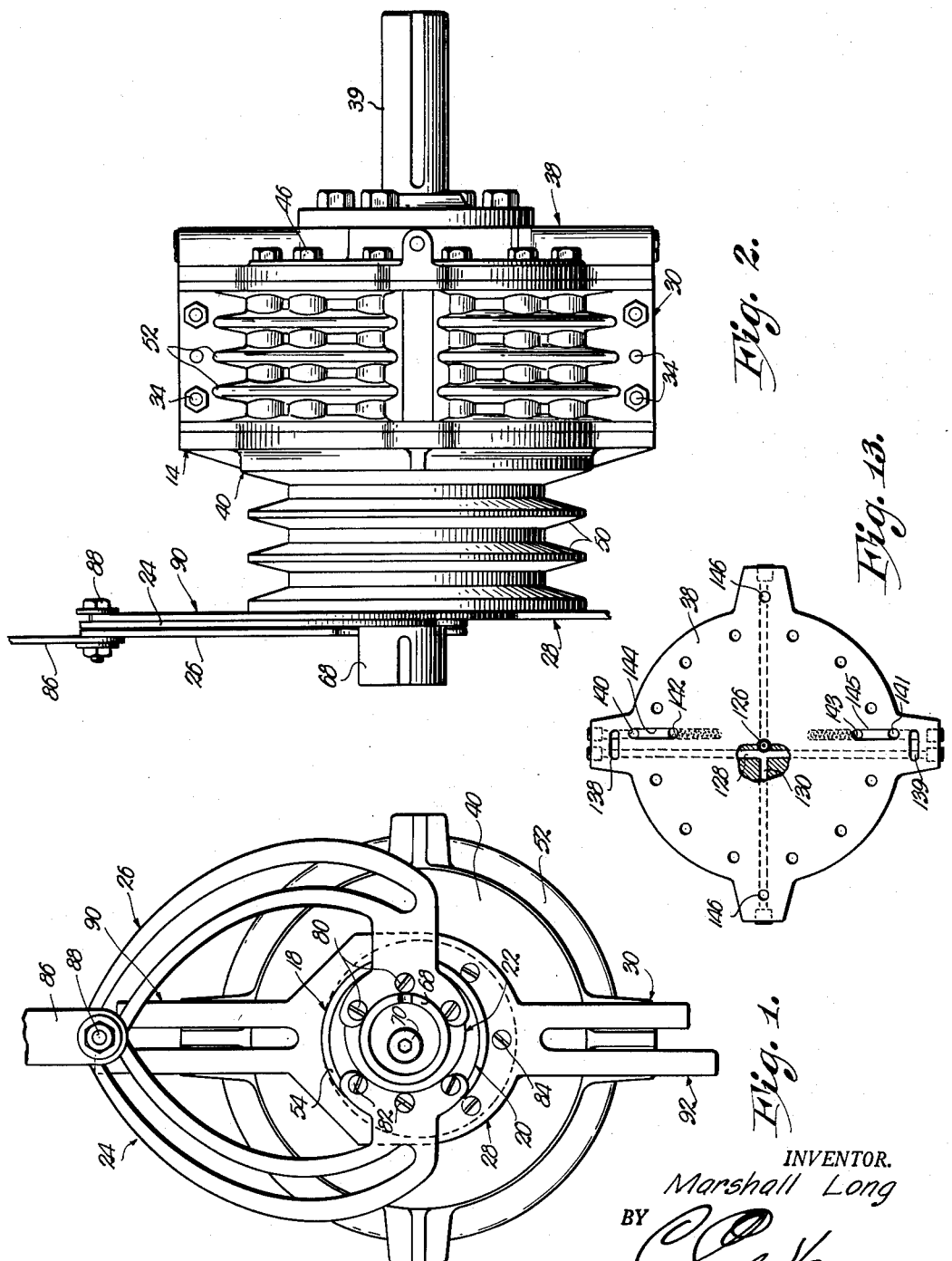
INVENTOR.
Marshall Long March 20, 1956      M. LONG      2,738,649
ROTARY PUMP AND MOTOR HYDRAULIC TRANSMISSION
Filed Dec. 1, 1952      4 Sheets-Sheet 2

INVENTOR.
Marshall Long
BY
ATTORNEY.

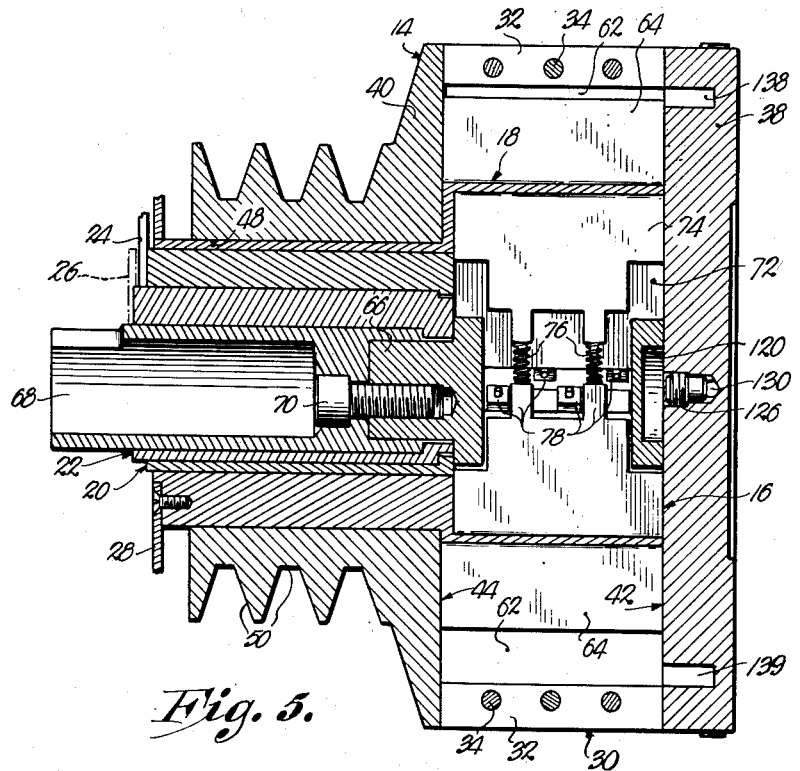

March 20, 1956     M. LONG     2,738,649
ROTARY PUMP AND MOTOR HYDRAULIC TRANSMISSION
Filed Dec. 1, 1952     4 Sheets-Sheet 4
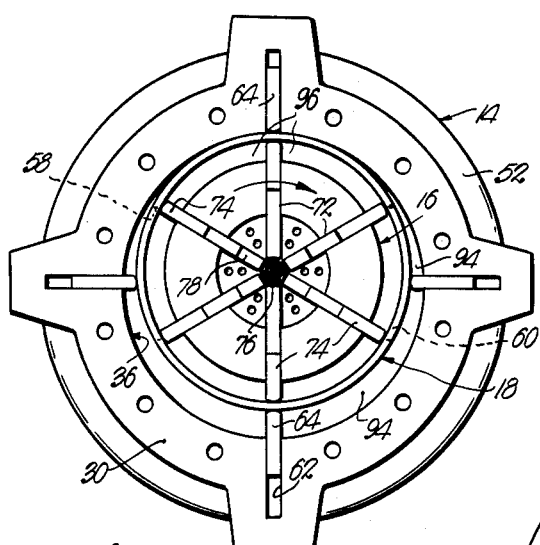
Fig. 14.
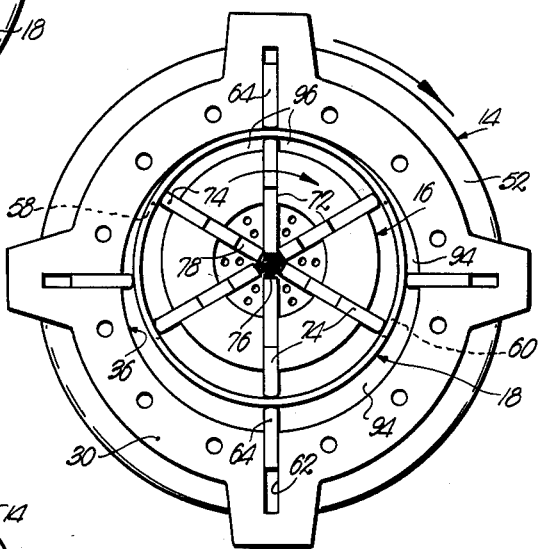
Fig. 15.
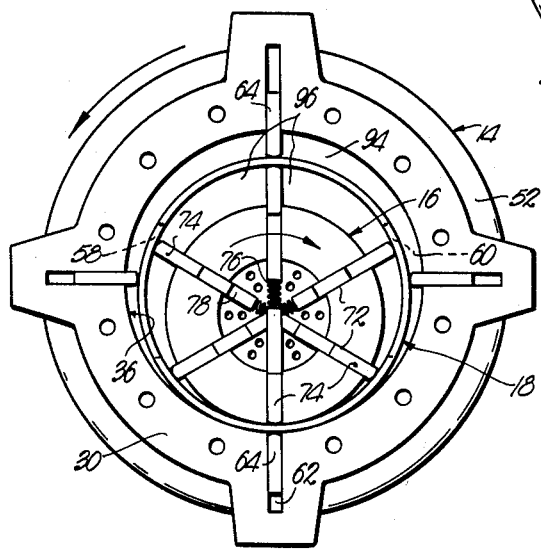
Fig. 16.
INVENTOR.
Marshall Long
BY 
ATTORNEY.

United States Patent Office 2,738,649
Patented Mar. 20, 1956

2,738,649
ROTARY PUMP AND MOTOR HYDRAULIC TRANSMISSION

Marshall Long, Overland Park, Kans.

Application December 1, 1952, Serial No. 323,477

4 Claims. (Cl. 60—53)

This invention relates to structure adapted to be interposed between a drive member and a driven member for transmitting power from a prime mover to any device or apparatus operably coupled with the driven member, the primary object being to provide a power transmission wherein the ratio or relative speeds of rotation of the drive member and driven member may be changed from neutral to direct drive as desired by the operator.

It is the most important object of the present invention to provide a non-slipping, constant mesh infinitely variable speed ratio power transmitting device wherein the ratio may be changed without power interruption through use of manually manipulable elements under direct control of the operator.

An object of this invention is the provision of a power transmission assembly that is capable of being manufactured in any desired manner to suit the demands of prime mover design, power needs, variable load conditions and other factors peculiar to the particular adaptation that is desired to be made of the assembly.

It is an important object of this invention to provide a hydraulic power transmission that includes a rotatable driven assembly and a rotatable drive assembly, each of which is in turn provided with a plurality of floatingly mounted, slidable vanes all housed within a fluid medium such as oil, the displacement of the fluid medium by the vanes of the drive member being directed against the vanes of the driven member as a means of impelling the latter.

It is another object of this invention to provide a transmission that includes a hollow shroud member provided with a fluid inlet port and a fluid outlet port and disposed to present engaging surfaces for the two sets of slidable vane assemblies above set forth.

It is an aim of this invention to provide a power transmission having a vaned rotor within a hollow shroud member and a vaned fluid-receiving housing encasing the shroud member, the vanes of the rotor forming with the innermost wall of the shroud member a plurality of individual chambers for receiving fluid from the inlet port of the shroud member and expelling such fluid from the outlet port of the shroud member, the vanes of the housing forming with the walls of the latter and with the outermost periphery of the shroud member, a plurality of additional chambers for receiving fluid from said outlet port and directing the fluid from the outermost chambers into the shroud member or more particularly, into the innermost chambers through the inlet port of the shroud member.

It is an additional object hereof to provide a power transmission wherein the outer housing and the shroud member are shiftable relative to the rotor to vary the axis of rotation of the rotor with respect to the axis of the cylindrical shroud member, thereby varying the extent of eccentricity of the rotor with respect to the shroud member and automatically varying the speed ratio between the rotor and said housing that rotates on the shroud member.

Another object hereof is the provision of an assembly as above set forth wherein the shroud member itself is also shiftable within and with respect to the surrounding housing permitting driving of the driven member at varying speeds in either of two directions.

Another important object hereof is to eliminate all power loss in a transmission of this type by furnishing the individual rotor chambers with an auxiliary supply of fluid as the same progressively increase in size while out of communication with the inlet and outlet ports and by relieving said chambers of fluid pressure as the same progressively decrease in size while out of communication with said ports, all automatically during continued operation of the assembly.

A further important object of this invention is to provide in a transmission of the aforementioned type, automatic means for maintaining the outermost housing vanes in engagement with the shroud member by overcoming the effect of centrifugal force thereon, such automatic means being capable of exerting progressively increased pressure on the housing vanes as the speed of rotation of the housing progressively increases.

It is an object of the particular type of transmission herein chosen for illustration to utilize the aforementioned fluid flow control means as the medium for exerting the necessary force upon the housing vanes to hold such vanes against the shroud member.

Other objects include the provision of an overall assembly that is inexpensive to manufacture, highly positive in its operation, long-lasting, of excellent performance, and easily maintained in operating order without the need of particular highly trained mechanical skill.

In the drawings:

Figure 1 is an end elevational view of a rotary pump and motor hydraulic transmission made according to my present invention, showing the controls in neutral.

Fig. 2 is a side elevational view thereof.

Fig. 5 is an enlarged, transverse, cross-sectional view taken on line V—V of Fig. 4 showing the cover illustrated in Fig. 3, but eliminating the tubular coupling on the cover plate that is shown in Fig. 2.

Fig. 6 is a fragmentary, cross-sectional view taken on line VI—VI of Fig. 4 and including the rotor end plate.

Fig. 7 is a perspective view of the rotor per se disconnected from its tubular extension shown in Figs. 1, 5 and 6, removed from within the housing and devoid of vanes and its end plate.

Fig. 13 is an elevational view of the innermost face of the plate shown in Figs. 3, 5, 8, 9 and 10.

Fig. 14 is an elevational view similar to Fig. 4, showing the position of the shroud and rotor when the controls therefor are disposed as shown in Fig. 1.

Fig. 15 is an elevational view similar to Figs. 4 and 14, showing the shroud and rotor adjusted for low speed in said one direction; and Fig. 16 is an elevational view similar to Fig. 4 showing the shroud and rotor adjusted for maximum speed in the opposite direction.

Figure 3:
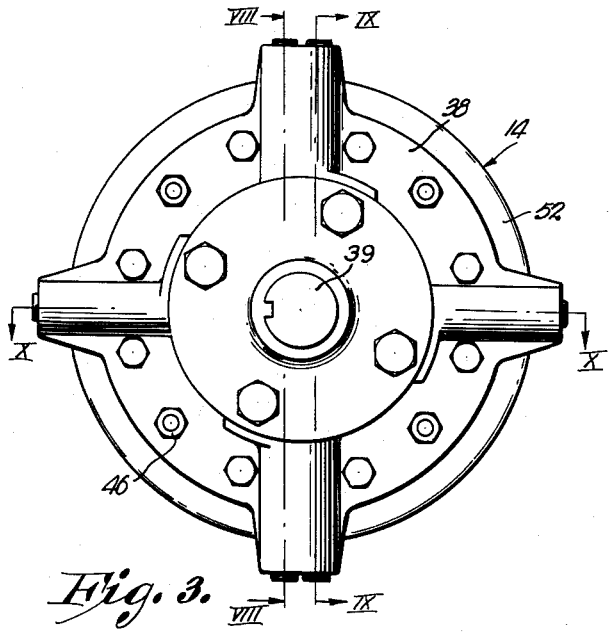
Fig. 3 is an elevational view showing that end of the transmission opposite to Fig. 1.

The primary component parts of the transmission assembly hereof include a housing broadly designated by the numeral 14, a rotor 16, a shroud member 18, an outer or large eccentric sleeve 20, an inner or small eccentric sleeve 22, and a plurality of actuating arms 24, 26 and 28.

Housing 14 includes a hollow section 30 adapted to receive oil or other fluid medium to carry out the hydraulic principles of the transmission, and secondarily, lubricate frictionally interengaging parts within the housing. Section 30 is composed of a pair of semi-circular sections having spacers 32 interposed therebetween and interconnected by bolts 34. The innermost surface 36 of the section 30 of housing 14 is therefore, cylindrical. The section 30 is closed along one side thereof by a cover plate 38 and at the opposite side thereof by a runner member 40 presenting a pair of opposed, flat, parallel surfaces 42 and 44 respectively, within the section 30. The two portions of the section 30, the cover plate 38 and the runner 40 are interconnected as a unit by means of a plurality of bolts 46. The runner 40 extends laterally, presenting a cylindrical bore 48 concentric with the axis of the cylindrical wall 36 and means to provide a plurality of belt-receiving pulley grooves 50. Heat dissipating means in the nature of a plurality of spaced ribs 52 surrounding the housing section 30, may be provided in the manner most clearly illustrated by Fig. 2 of the drawings if desired.

Figure 4:
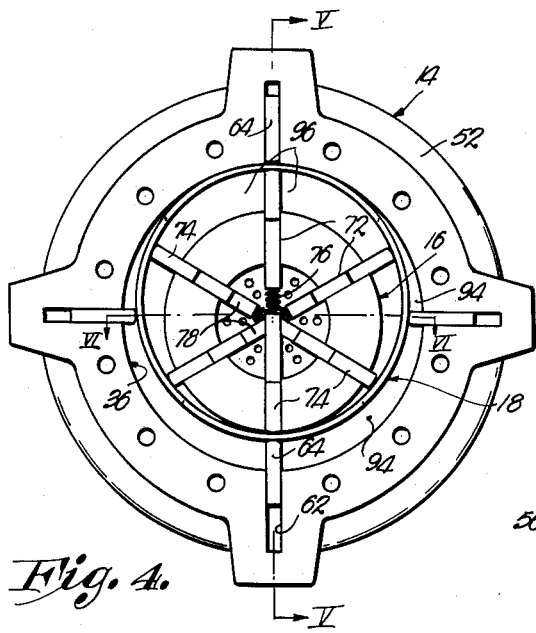
Fig. 4 is an elevational view of the transmission with the cover plate shown in Fig. 3 and the rotor end plate shown in Fig. 5 entirely removed, showing the shroud and rotor in maximum speed position in one direction.
Figure 11:
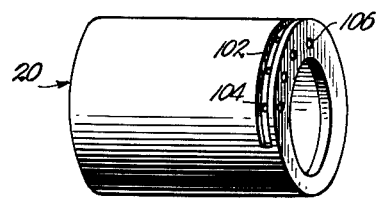
Fig. 11 is a perspective view of the outermost eccentric sleeve shown in Figs. 1, 5 and 6, entirely removed from its surrounding relationship to the innermost eccentric sleeve.

The hollow shroud member 18 is cylindrical, presenting an innermost and outermost periphery as is clear in Fig. 4, one face of the shroud member 18 being open and the opposite face thereof being provided with a tubular bearing 54 eccentric with the axis of the shroud member 18. The innermost face 56 of tubular bearing 54 is eccentric to the axis of bearing 54 as is clear in Figs. 5 and 12. The outside diameter of the tubular bearing 54 is substantially the same as the inside diameter of the runner extension 40 of housing 14 within which the tubular bearing 54 is disposed for rotation relative to the housing 14. Housing 14 is, therefore, rotatably mounted on the bearing 54. Bearing 54 extends slightly beyond the runner extension 40 and the outside diameter of shroud 18 is appreciably less than the inside diameter of housing section 30 as shown in Figs. 4 and 5. It is also noted in Fig. 5 that the length of shroud member 18 is substantially the same as the distance between the parallel walls 42 and 44 between which member 18 is disposed. An elongated inlet port 58 and a similarly shaped outlet port 60 diametrically opposed to port 58 are formed in the shroud member 18. A plurality of radial slots 62 formed in the housing section 30 slidably receive a like number of vanes 64 for radial movement to a position engageable with the outer periphery of shroud member 18, vanes 64 spanning the distance between the parallel walls 42 and 44 as shown in Fig. 5.

The rotor 16 is of circular, cross-sectional contour and spans the distance between the innermost face of one wall of shroud member 18 within which rotor 16 is disposed, and the flat face 42 of housing section 30 as shown in Fig. 5. Rotor 16 has a concentric extension 66 that projects into the bearing 54 and receives a tubular coupling 68 that extends outwardly beyond the bearing 54. Coupling 68 is connected with the extension 66 by means of a bolt 70 that is eccentric to the coupling 68 and to the extension 66, to the end that bolt 70 will always be locked against loosening during rotation of rotor 16, extension 66 and coupling 68 as a unit.

Rotor 16 has three continuous slots 72 therethrough for slidably receiving three opposed pairs of vanes 74 that engage the innermost cylindrical periphery of the shroud member 18 in opposed relationship to the vanes 64, as shown in Fig. 4. The vanes 74 are equal in length to the rotor 16 at the outermost ends thereof and opposed pairs of vanes 74 are held biased apart by a pair of springs 76 to augment the action of centrifugal force in maintaining the vanes 74 in engagement with the inner peripheral surface of shroud member 18. Springs 76 are mounted on inwardly extending fingers 78 forming a part of the vanes 74, the three sets of four fingers each being offset relatively as shown in Figs. 4 and 5 within the slots 72 so that all of the vanes 74 are free to slide within their slots 72 without interference one with the other.

The two tubular eccentric sleeves 20 and 22 are relatively telescoped, the inner or smaller sleeve 22 surrounding the coupling 68 and a portion of the extension 66 and being locked in place as shown in Figs. 5 and 6, and the outer or larger sleeve 20 surrounding the sleeve 22 in engagement with the bearing 54, sleeve 20 being also locked in place with the sleeve 22.

The arcuate arm 26 is connected directly to the inner sleeve 22 by screws 80 as shown in Fig. 1, the arcuate arm 24 being joined directly to the outer eccentric sleeve 20 by screws 82, and the elongated arm 28 partially surrounding the bearing 54 and being connected thereto by screws 84. Slotted arms 24 and 26 are interconnected and pivotally joined to an operating element 86 by a pivot pin 88. Arm 28 has a pair of diametrically opposed, slotted projections 90 and 92, each of which is adapted to guide the pin 88 when the same is reciprocated by an operator of element 86 toward and away from the axis of coupling 68 to simultaneously rotate the eccentric sleeves 20 and 22 relative to each other, to the coupling 68, and to the bearing 54, as well as to the housing 14. It is thus seen that by manipulation of the element 86 to swing the arms 24 and 26 toward and away from each other, sleeves 20 and 22 will be rotated to shift the shroud member 18 and therefore, housing 14, rectilinearly, toward and away from the axis of rotor 16. In Figs. 1 and 14, the position of the rotor 16 relative to the shroud member 18 and the housing 14 is such as to prevent transmission of power, and therefore, transmission is in neutral when pivot pin 88 is disposed as shown in Fig. 1. When pin 88 is moved to the inner end of the projection 90, shroud 18 and housing 14 are raised. Thus, in Fig. 4 of the drawings, shroud member 18 and housing 14 are shown at one end of their path of travel in one direction remote from the axis of rotor 16 where rotor 16 is nearly in engagement with the inner periphery of shroud member 18. Such maximum speed disposition is obtained by moving member 86 to shift pivot 88 from the neutral position shown in Figs. 1 and 13, downwardly in slotted extension 90 toward the extension 92. By virtue of the fact that there is provided a pair of eccentric sleeves 20 and 22, each having an operating arm 24 and 26 respectively, shroud member 18 and housing 14 move along a rectilinear path of travel intersecting the axis of rotation of rotor 16.

Movement of the pin 88 to a position intermediate the ends of its vertically reciprocable path of travel in projection 90, positions the housing 14 and the shroud member 18 relative to rotor 16, as shown in Fig. 15, which be termed the low speed position in one direction.

Shroud member 18 is shown in Figs. 4, 5, 14 and 15 eccentrically disposed with respect to the wall 36 of housing section 30 at the uppermost end of the latter. Its position may be adjusted by swinging the arm 28 180° anti-clockwise, viewing Fig. 1, relative to the rotor 16 and arms 24 and 26 when the latter are in neutral as shown in Fig. 1. In the new position of the arm 92, variable speed characteristics are attained in the same manner by the shifting of housing 14 and shroud member 18 relative to rotor 16. When the arm 28 is swung 180 degrees with respect to arms 24 and 26, thereby positioning the slotted projection 92 in alignment with the pivot pin 88, rotor 16 and housing 14 rotate in opposite directions relatively. While arms 24 and 26 shift shroud member 18 along a rectilinear path of travel, the movement of the shroud member 18 by rotating arm 28 is rotative on the axis of the inner face 56 of bearing 54.

Fig. 16 illustrates the new position of shroud 18 relative to housing 14, and also shows the relative positions of the rotor 16 and the shroud 18 when pivot pin 88 is at the inner end of projection 92. This is the maximum speed position in the opposite direction. The neutral position, when the arm 28 is reversed from Fig. 1, is not shown, but is obviously obtained by moving pivot pin 88 to the outermost open end of projection 92. Rotor 16 would then be concentric with shroud 18, as in Fig. 14, but with shroud 18 at the lower end of housing 14, as shown in Fig. 16.

The slidable vanes 64 of the housing 14 form with the cylindrical face 36 and the outer periphery of shroud member 18 a plurality of chambers 94 that successively reduce to zero during rotation of the housing 14 adjacent the top of housing section 30 when the shroud member 18 is disposed as shown in Fig. 4. The vanes 74 likewise form with the inner periphery of shroud member 18, a plurality of inner chambers 96 that successively reduce to zero adjacent the bottom of shroud member 18 when the latter is disposed as shown in Fig. 4 during rotation of rotor 16.

Since the chambers 94 progressively decrease in volume during rotation of housing 14 as they approach the inlet port 58, the fluid within the housing 14 will be forced into the chambers 96 within shroud member 18, through the inlet port 58 while the chambers 96 are progressively increasing in volume. Conversely, the chambers 96 progressively decrease in volume and the chambers 94 progressively increase in volume as the outlet port 60 is approached, whereby the fluid in shroud member 18 is forced through the outlet port 60 into the housing 14. Manifestly, opposed forces, i. e. pressure on the one hand and suction on the other hand both at the inlet port 58 and at the outlet port 60, impel such movement or displacement of the fluid from within the shroud member 18 to the housing 14 and vice versa.

It is to be noted that between the inlet port 58 and the outlet port 60 in the clockwise rotation of rotor 16, viewing Fig. 4, each chamber 96 moves to a position where it is neither in register with the inlet port 58 nor the outlet port 60 for a short period of time. Likewise, viewing Fig. 4, each chamber 96 moves to a completely closed position between outlet port 60 and inlet port 58 at the bottom of shroud member 18 during each cycle of rotation of rotor 16.

As chambers 96 move out of communication with inlet port 58 and while their volumes are still increasing, there is a decrease of pressure or suction created therein. Thereupon, just prior to communication with outlet port 60, a pressure increase within chambers 96 is produced by virtue of their progressively decreasing volumes. Conversely, as chambers move out of communication with outlet port 60 and before they re-communicate with inlet port 58 there is first an increase in pressure because of progressive decrease in volume and then a decrease in pressure because of progressive increase in volume.

This normal condition of first a suction and then a pressure build-up within the chambers 96 adjacent the top of shroud member 18 between the ports 58 and 60, and, thereupon, first a pressure build-up and then a suction in chambers 96 adjacent the bottom of shroud member 18 between ports 58 and 60, viewing Fig. 4, would cause a power loss but for the provision of a fluid flow system forming a part of the present invention.

Figure 12:
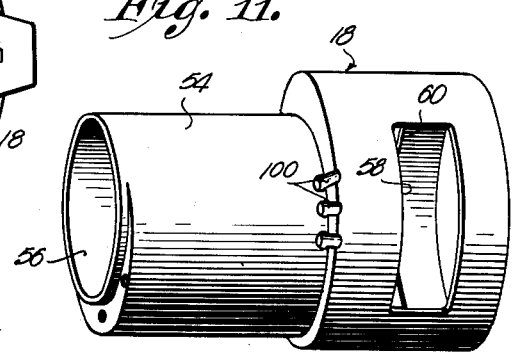
Fig. 12 is a perspective view of the shroud member that fits within the housing in the manner shown in Figs. 4, 5 and 6, entirely removed from the remaining parts of the transmission.

The bearing 54 of shroud member 18 is provided with a plurality of diametrically opposed openings 98 and 100 (Fig. 6) next adjacent the shroud member 18 as shown also in Fig. 12. The outer sleeve 20 is provided with an arcuate groove 102 adjacent the innermost end thereof alternately registrable with the openings 98 and 100, depending upon the relative positions of the sleeve 20 and the bearing 54. A plurality of openings 104 in the sleeve 20 communicating with the groove 102, also communicate with openings 106 in the innermost end of sleeve 20, each opening 106 being perpendicular to a respective opening 104.

A plurality of sockets 108 in that end of rotor 16 adjacent extension 66 (shown only in Fig. 6) successively register with the openings 106 as rotor 16 rotates with respect to sleeve 20. Each socket 108 communicates with a corresponding radial port 110 in the rotor 16 (Figs. 6 and 7). The sockets 108 are parallel with the axis of rotation of rotor 16 but a plurality of additional sockets 112 (Fig. 6) are radially disposed in the rotor 16 and communicate with ports 114 (Figs. 4, 6 and 7) that discharge through openings 116 (Fig. 6) in a cup-shaped end plate 118 (Figs. 5 and 6) removably attached to the rotor 16 on its axis of rotation within a socket 120 (Figs. 4–7) in opposed relationship to extension 66.

Each of the sockets 108 is provided with a spring-loaded ball check valve 122 (Fig. 6) that is normally closed but which opens as fluid passes from chambers 94 to openings 98 or 100 as the case may be, into groove 102, through openings 104 and 106, into sockets 108 and thence into chambers 96. The sockets 112 are likewise each provided with a normally closed spring-loaded ball check valve 124 (Figs. 6 and 7) that opens when fluid flows from chambers 96 to ports 114 and openings 116, and thence past a centrally disposed, normally closed spring-loaded ball check valve 126 in the cover plate 38.

Figures 8, 9:
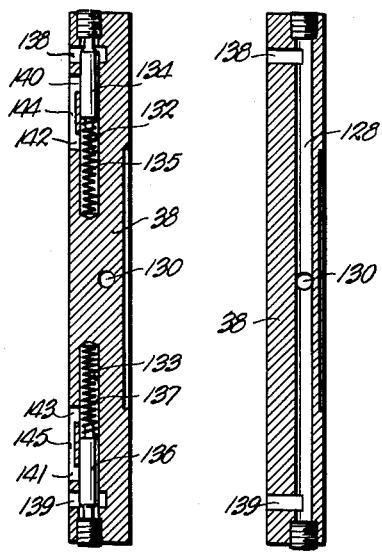
Fig. 8 is a cross-sectional view through the cover plate shown in Figs. 3 and 5, taken on line VIII—VIII of Fig. 3.
Fig. 9 is a cross-sectional view similar to Fig. 8 taken on line IX—IX of Fig. 3.
Figure 10:
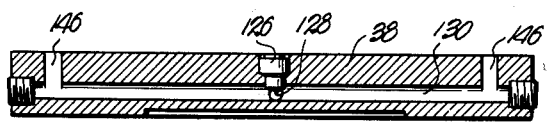
Fig. 10 is a cross-sectional view similar to Figs. 8 and 9 taken on line X—X of Fig. 3.

Such fluid passes from the valve 126 into a pair of crossed, intercommunicating passages 128 and 130 formed in the end plate 38 as shown in Figs. 9, 10 and 13. The end plate 38 is also provided with a pair of diametrically opposed sockets 132 and 133 (Figs. 8 and 13) spaced from, and parallel with the passage 128 for receiving valves 134 and 136 that alternately open and close during operation of the transmission. Both valves 134 and 136 are biased to the closed position not only by springs 135 and 137, but by the action of centrifugal force.

Sockets 132 and 133 are connected with the passage 128 by cross cavities 138 and 139 (Fig. 13). A pair of spaced openings 140 and 142 (Figs. 8 and 13) for valve 134 communicate with the socket 132 inwardly from the cross cavity 138 and are joined by a groove 144 in the innermost face of the end plate 38. A pair of spaced openings 141 and 143 for valve 136, communicate with the socket 132 inwardly from the cross cavity 139 and are joined by a groove 145 in the innermost face of the end plate 38.

The openings 140 and 141 are closed by housing section 30. When shroud 18 is in the position shown in Fig. 4, the opening 142 registers with the interior of shroud 18 and the opening 143 communicates with the interior of housing section 30 exteriorly of shroud 18.

As shown in Fig. 5 of the drawings, the cross cavities 138 and 139 register with one pair of slots 62 in the housing section 30 between sockets 132 and 133 and passage 128 to discharge fluid from the passage 128 behind a corresponding pair of vanes 64 and a pair of openings 146 in the plate 38 communicating with the passage 130 register with a second pair of slots 62 to discharge fluid from the passage 130 behind a second pair of vanes 64. In other words, each of the openings 146 and each of the cross cavities 138 and 139 are in direct alignment and in communication with a corresponding slot 62.

It is now seen that, by virtue of the interconnection of crossed passages 128 and 130, there is always an equalization of pressure behind the vanes 64 to overcome the action of centrifugal force and to hold the said vanes 64 in frictional engagement with the outer periphery of shroud member 18. The sliding movement of the vanes 64 within their respective slot 62, has no effect whatsoever upon the pressure within the passages 128 and 130 since, as each vane 64 moves outwardly, the liquid therebehind within the corresponding slot 62, is displaced to other slots 62 behind vanes 64 that are moving inwardly. Such normal operation of the vanes 64 continues without pressure loss which would be caused by reverse flow, since check valve 126 will not permit the fluid to return to cavity 120. In this respect it is to be noted that cavity 120 is always in register with the valve 126 notwithstanding the adjustments of rotor 16.

When the pressure of oil entering the passages 128 and 130 past valve 126, increases beyond a predetermined point, the same will act upon the valves 134 and 136 alternately to discharge such increased pressure into the shroud member 18, or into the housing section 30 exteriorly of shroud member 18 because of the changing pressure differentials interiorly and exteriorly of shroud member 18. If, at the time of increased pressure in passages 128 and 130, the pressure exteriorly of shroud member 18 exceeds the pressure within shroud member 18, oil in the cavity 138 will act on valve 134 against the action of centrifugal force and the force of spring 135 to place the cavity 138 into communication with the opening 140. From opening 140, the oil discharges into the shroud member 18 when the latter is disposed as shown in Fig. 4, by way of groove 144. During such opening of valve 134, oil within the socket 132 will be displaced into the shroud member 18 by way of opening 142.

When the pressure within the shroud member 18 is greater than the pressure exteriorly of shroud member 18 at the time that the pressure behind vanes 64 reaches the aforementioned predetermined point, valve 136 will open and such increased pressure will be exhausted into the housing section 30 from cavity 139, through opening 142 and groove 145, the opening 143 serving to evacuate the socket 133 behind valve 136.

Such fluid flow operates in conjunction with the auxiliary flow of fluid into and out of chambers 96 whenever the latter are neither in communication with inlet port 58 or outlet port 60 as above described. Whenever a suction is created within a chamber 96, oil passes thereinto from the housing section 30 exteriorly of the shroud member 18, by way of openings 98 or 100 as the case may be, discharging into the shroud member 18 by way of openings 110. Whenever an increased pressure exists within the chambers 96 it is bled off into the cavity 120, past valves 124 and by way of openings 114 and 116.

It is now apparent also that at the time the auxiliary flow of oil enters the chambers 96, the pressure exteriorly of the shroud member 18 is greater than the pressure within shroud member 18 and conversely, at the time of bleeding off of excess pressure in chambers 96, the pressure exteriorly of shroud member 18 is less than the pressure within shroud member 18, presenting therefore, a completely balanced system not only with respect to pressure changes within the chambers 96, but with respect to maintaining vanes 64 in frictional contact with shroud member 18 at all times.

It is apparent from the foregoing that either the rotor 16 or the housing 14 may be rotated by coupling a suitable prime mover therewith. In the event that housing 14 is to be rotated to in turn cause rotor 16 to rotate, the prime mover may be either connected to shaft 39 (Figs. 2 and 3) or operably coupled with pulley grooves 50. In such operation any machine to be driven will be operably connected with the coupling 68.

Conversely, if the rotor 16 is to be rotated to in turn drive the housing 14 and, therefore, the shaft 39, the prime mover will be connected with the coupling 68 and the machine to be operated will be either driven from the shaft 39 or from the pulley grooves 50. In the latter instance, coupling 68 and the drive shaft of the prime mover joined thereto, will be preferably supported for rotation by suitable bearings (not shown) and held against movement in any direction away from the axis of rotation of coupling 68 and rotor 16. Thus, all movement that is effected by adjustment of the arms 24 and 26, and/or the arm 28, is with respect to the rotor 16. Since the housing 14 reciprocates vertically not only when the pivot pin 88 is moved through a vertical path of travel but when the arm 28 is rotated 180°, it is to be preferred that belts trained around the pulley grooves 50, be disposed horizontally. If such belts are aligned with the reciprocable path of travel of the housing 14, then suitable belt tighteners would be needed. In the event that a driven member is to be coupled with the shaft 39, a suitable universal coupling between the shaft 39 and the driven shaft of such machine will permit the free reciprocable movement of the housing 14 relative to the rotor 16.

Having thus described the invention what is claimed as new and desired to be secured by Letters Patent is:

1. In an infinitely variable power transmission assembly, a hollow, cylindrical shroud member having a tubular bearing, a fluid inlet port, and a fluid outlet port, said ports being diametrically opposed; a hollow, fluid-receiving housing rotatably mounted on said bearing and encasing said member; a plurality of vanes carried by said housing therewithin and engageable with the outermost periphery of said member; structure within the bearing; a rotor within the member and having an extension rotatable within said structure, the axis of rotation of the rotor being normally coincident substantially with the axis of said member; and a plurality of vanes carried by said rotor and engageable with the innermost periphery of the member, said structure being movable relative to the bearing for shifting the member relative to the rotor in a direction to shift said axis of the member toward and away from said axis of the rotor, said structure including a pair of relatively rotatable sleeves within the bearing, one of the sleeves surrounding said bearing and being eccentric thereto and the other sleeve surrounding the one sleeve and being eccentric to the latter for limiting the member to a substantially rectilinear path of travel substantially midway between said ports as the sleeves are rotated relatively to shift the member.

2. In an infinitely variable power transmission assembly, a hollow shroud member having a fluid inlet port and a fluid outlet port, there being a tubular bearing extending from said member and eccentric thereto; a hollow, fluid receiving housing rotatably mounted on said bearing and encasing said member; a plurality of vanes carried by said housing therewithin for independent radial reciprocation relative thereto, each directly engaging the outermost periphery of said member; a rotor rotatably mounted in said bearing and encased within said member; and a plurality of vanes carried by said rotor for independent radial reciprocation relative thereto, each directly engaging the innermost periphery of the member, said bearing comprising an eccentric having inner and outer annular surfaces supporting the rotor and housing respectively, the axes of said surfaces being radially spaced for shifting said rotor and the housing relatively upon rotation of the bearing relative to the rotor.

3. In an infinitely variable power transmission assembly, a hollow shroud member having a fluid inlet port and a fluid outlet port, there being a tubular bearing extending from said member and eccentric thereto; a hollow, fluid receiving housing rotatably mounted on said bearing and encasing said member; a plurality of vanes carried by said housing therewith and engageable with the outermost periphery of said member; tubular eccentric structure within the bearing; a rotor within the member and having an extension rotatable within said structure; and a plurality of vanes carried by said rotor and engageable with the innermost periphery of the member, said structure being movable relative to the bearing for shifting the rotor and the member relatively, said bearing comprising an eccentric having inner and outer annular surfaces supporting the rotor and housing respectively, the axes of said surfaces being radially spaced for shifting said member and the housing relatively upon rotation of the bearing relative to the rotor.

4. In an infinitely variable power transmission assembly, a hollow, cylindrical shroud member having a fluid inlet port and a fluid outlet port; a tubular bearing extending from the member, said bearing being eccentric to the axis of the member; a pair of sleeves in the bearing; a hollow, fluid receiving, cylindrical housing rotatably mounted on said bearing and encasing said member; a plurality of vanes carried by said housing therewithin and engageable with the outermost periphery of said member; a rotor encased within said member; an extension on the rotor rotatably mounted in said bearing, said rotor being concentric to the axis of rotation of the extension; and a plurality of vanes carried by said rotor and engageable with the innermost periphery of the member, said bearing comprising an eccentric having inner and outer annular surfaces supporting the rotor and housing respectively, the axes of said surfaces being radially spaced for shifting the axes of the housing and the rotor relatively upon rotation of the bearing relative to the rotor, one of the sleeves being rotatably mounted on the extension and being eccentric thereto, the other sleeve being rotatably mounted on the one sleeve and being eccentric to the latter whereby when the sleeves are relatively rotated the axes of the rotor and of the member are shifted relatively.

References Cited in the file of this patent

UNITED STATES PATENTS

| | | |
|---|---|---|
| 466,662 | Duncan | Jan. 5, 1892 |
| 1,497,741 | Schneider | June 17, 1924 |
| 2,157,120 | Curtis | May 9, 1939 |
| 2,434,546 | Breedlove | Jan. 13, 1948 |
| 2,589,362 | Foster | Mar. 18, 1952 |